(12) United States Patent  
Lang et al.

(10) Patent No.: US 8,831,848 B2  
(45) Date of Patent: Sep. 9, 2014

(54) ELECTRO-HYDRAULIC CLUTCH SYSTEM

(75) Inventors: Kenneth K. Lang, Saline, MI (US);  
Hamid Vahabzadeh, Oakland, MI (US);  
Christian Rübsam, Bodenheim (DE)

(73) Assignee: GM Global Technology Operations, LLC, Detroit, MI (US)

( * ) Notice: Subject to any disclaimer, the term of this patent is extended or adjusted under 35 U.S.C. 154(b) by 78 days.

(21) Appl. No.: 13/481,059

(22) Filed: May 25, 2012

(65) Prior Publication Data

US 2013/0317717 A1 Nov. 28, 2013

(51) Int. Cl.  
*G06F 7/00* (2006.01)  
*G06F 17/00* (2006.01)  
*G06F 19/00* (2011.01)

(52) U.S. Cl.  
USPC .......... 701/67; 701/29.1; 701/29.2; 792/3.51; 477/70

(58) Field of Classification Search  
USPC ............ 701/1, 36, 51, 67, 68; 192/3.51–3.63; 477/5, 6, 57, 62, 70, 77, 79, 83, 86  
See application file for complete search history.

(56) References Cited

U.S. PATENT DOCUMENTS

| | | | |
|---|---|---|---|
| 2006/0169338 A1* | 8/2006 | Takagi | 137/625.64 |
| 2008/0200301 A1* | 8/2008 | Shimizu et al. | 477/2 |
| 2010/0082209 A1* | 4/2010 | Yoshioka et al. | 701/62 |
| 2010/0229969 A1* | 9/2010 | Ishikawa et al. | 137/511 |
| 2011/0233023 A1* | 9/2011 | Fujikane et al. | 192/85.01 |

FOREIGN PATENT DOCUMENTS

KR  2010-0091487 A  8/2010

* cited by examiner

*Primary Examiner* — Rami Khatib

(57) ABSTRACT

An electro-hydraulic clutch system for a motor vehicle includes a clutch mechanism that selectively engages an engine of the motor vehicle with a gear box, an actuator that pumps and retrieves hydraulic fluid to and from the clutch mechanism to activate the clutch mechanism, and a solenoid with a valve and/or a check ball that is disposed in the path of the hydraulic fluid between the actuator and the clutch mechanism. The solenoid has a normally closed position to prevent flow of the hydraulic fluid back to the actuator in the event of a system failure. The solenoid can also be used to reduce energy consumption in steady state conditions.

16 Claims, 2 Drawing Sheets

ELECTRO-HYDRAULIC CLUTCH SYSTEM

FIELD

Figure 1:
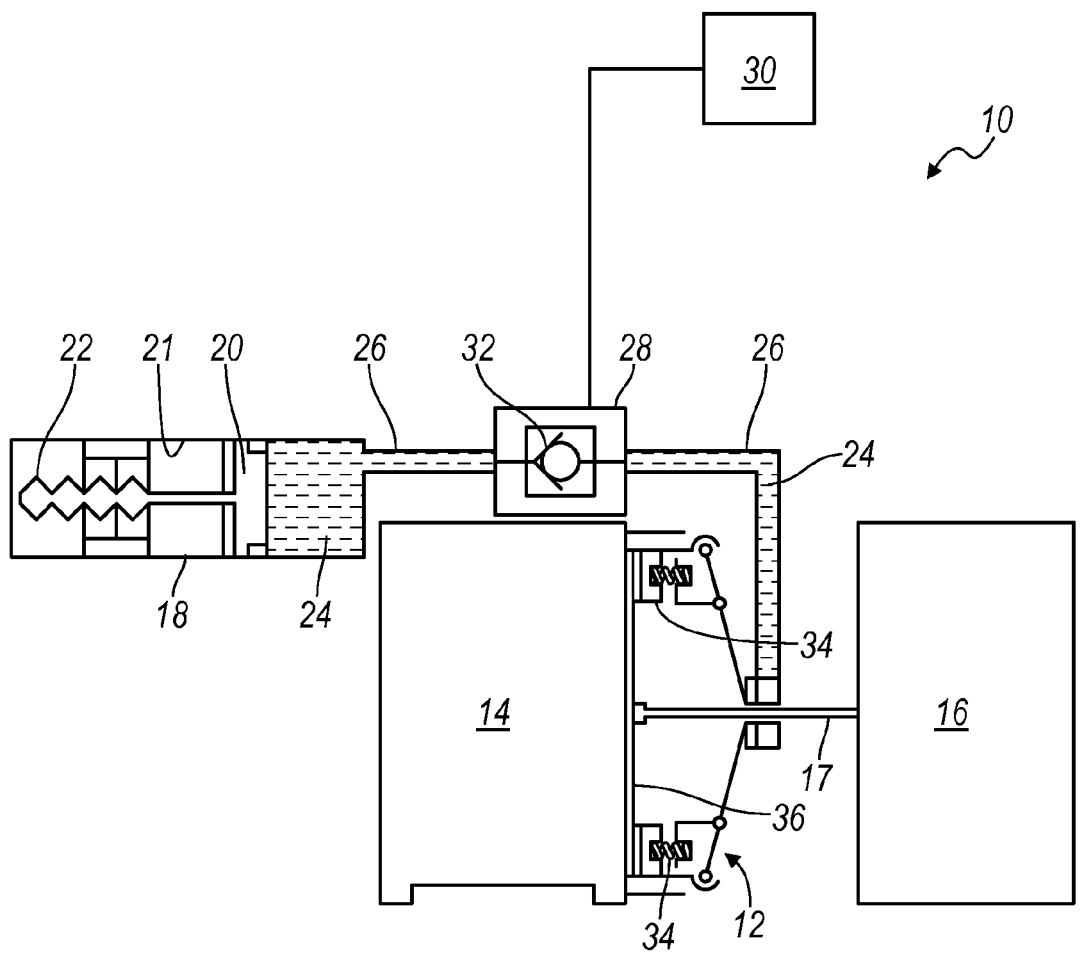

The present disclosure relates to a motor vehicle transmission. More specifically, the present disclosure relates to an electro hydraulic clutch by wire motor vehicle transmission.

BACKGROUND

The statements in this section merely provide background information related to the present disclosure and may or may not constitute prior art.

A typical motor vehicle transmission includes a hydraulic control system that is employed to actuate torque transmitting devices. These torque transmitting devices may be, for example, friction clutches that when engaged couple an engine with a gearbox. The conventional hydraulic control system typically includes a main pump or actuator that provides a pressurized fluid, such as oil, that activates the clutch to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

An electro-hydraulic clutch system for a motor vehicle includes a clutch mechanism that selectively engages an engine of the motor vehicle with a gear box, an actuator that pumps and retrieves hydraulic fluid to and from the clutch mechanism to activate the clutch mechanism, and a solenoid with a valve and/or a check ball that is disposed in the path of the hydraulic fluid between the actuator and the clutch mechanism. The solenoid has a normally closed position to prevent flow of the hydraulic fluid back to the actuator in the event of a fault in the electro-hydraulic clutch system. The solenoid can also be used to reduce energy consumption in steady state conditions.

Further features, advantages, and areas of applicability will become apparent from the description provided herein. It should be understood that the description and specific examples are intended for purposes of illustration only and are not intended to limit the scope of the present disclosure.

DRAWINGS

Figure 2:
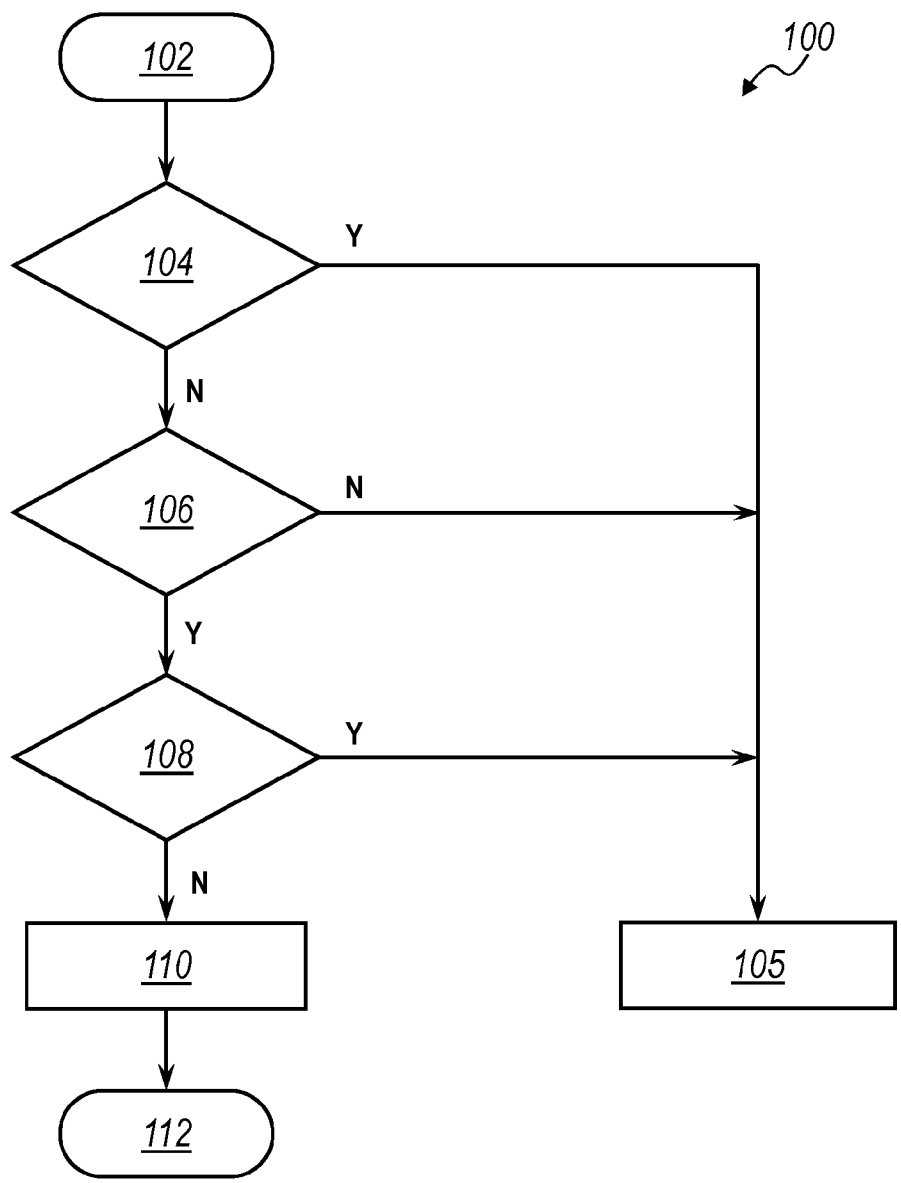

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 1 is a schematic drawing of an electro-hydraulic clutch for a motor vehicle transmission in accordance with the principles of the present invention; and FIG. 2 is a flow diagram of a process for operating the electro-hydraulic clutch shown in FIG. 1.

DETAILED DESCRIPTION

The following description is merely exemplary in nature and is not intended to limit the present disclosure, application, or uses.

Referring now to FIG. 1, an electro-hydraulic clutch system embodying the principles of the present invention is designated at 10. The electro-hydraulic clutch system 10 includes a clutch mechanism 12 that selectively engages an engine 14 with a gearbox 16 through a drive shaft 17. The electro-hydraulic clutch system 10 also includes an actuator 18 that pumps a hydraulic fluid 24, such as, for example oil through a conduit 26 to and from the clutch mechanism 12. The flow of the hydraulic fluid results in the opening and closing of the clutch mechanism 12. Note, that the present invention is not limited to any particular type of normally open or closed clutch system. For example, in a normally open clutch system, the flow of hydraulic fluid to the clutch mechanism 12 causes a set of actuation devices 24 to engage a clutch 36, thereby coupling the engine 14 to the gearbox 16 and the remainder of the drivetrain through the drive shaft 17. As the hydraulic fluid flows away from the clutch mechanism 12, the actuation devices 24 disengage the clutch, thereby de-coupling the engine from the gearbox 16 and the remainder of the drivetrain.

Alternatively, in a normally closed clutch system, the flow of hydraulic fluid away from the clutch mechanism 12 causes the set of actuation devices 24 to engage the clutch 36, thereby coupling the engine 14 to the gearbox 16 and the remainder of the drivetrain through the drive shaft 17. Further, in the normally closed clutch system, as the hydraulic fluid flows to the clutch mechanism 12, the actuation devices 24 disengage the clutch, thereby de-coupling the engine from the gearbox 16 and the remainder of the drivetrain.

The actuator 18 includes a piston 20 that reciprocates in a bore 21. The piston 20 can be driven by any suitable electronic, mechanical, or electro-mechanical mechanism 22. As the piston 20 reciprocates in the bore 21, the hydraulic fluid 24 is pumped out of and retrieved back into the actuator 18. The actuator 18 may be operated under the direction of any suitable controller associated with the motor vehicle. The actuator 18 may pump hydraulic fluid to other various devices or parts that may require fluid flow for hydraulic control functions, lubrications, or cooling, such as, for example, rotatable shafts, gearing arrangements, and/or or other torque transmitting devices.

The electro-hydraulic clutch system 10 further includes a solenoid 28 disposed in the path of the flow of hydraulic fluid 24. The solenoid 28 includes a valve that is normally closed to prevent oil from flowing in the reverse direction during any failure of the electro-hydraulic control system 10, including, but not limited to, a power failure or a failure of any control unit associated with the electro-hydraulic control system 10. This feature prevents the unintended application of the clutch 36. As shown in FIG. 1, the solenoid 28 is operated by electronic controller 30. The electronic controller 30 may include software algorithm, such as, for example, described below, stored in a non-transitory computer readable mechanism. Note that the present invention is not limited to a normally closed solenoid. For example, the solenoid 28 can include a check ball 32 that is actuated by the solenoid 28. Specifically, the solenoid 28 under the direction of the controller 30 opens and closes the check ball 32 to open and close off the flow of hydraulic fluid 24 between the actuator 18 and the clutch mechanism 12. The check ball 32 itself is normally closed.

That is, when power is cut off from the solenoid 28, the check ball closes to prevent flow of hydraulic fluid in the reverse direction back to the actuator.

Turning now to FIG. 2, there is shown a process 100 for operating the electro-hydraulic clutch system 10. The process 100 can be, for example, implemented as software algorithm in the controller 30.

In a particular, arrangement the process 100 begins in a step 102. Next the process 100 proceeds to a decision step 104, which may be a safety algorithm, where the process determines if there has been a fault in the controller 30, or a fault such as, for example, a system failure of the electro-hydraulic clutch system 10, a failure of any control unit associated with the electro-hydraulic clutch system 10, or a failure of a diagnostic event. If the decision step 104 determines that there has been a fault, the process proceeds to a step 105, which de-energizes the solenoid 28. This results in closing the valve in the solenoid 28, or the check ball 32, if the solenoid 28 includes a check ball. In any case, the flow of hydraulic fluid 24 is stopped, such that, the clutch mechanism 12 remains open (i.e. dis-engaged), for example, if the motor vehicle is at an intersection, or remains closed (i.e. engaged), for example, if the motor vehicle is moving along a highway.

If, however, the decision step 104 determines that there has not been a system fault, then the process proceeds to a decision step 106. Here, the process determines, with the use of a clutch control algorithm, if the clutch pedal is actuated. If the clutch pedal is not actuated, that is, the answer to the decision step 106 is no, then the process again proceeds to the step 105 where the solenoid 28 is de-energized to close the flow of hydraulic fluid 24 by closing the solenoid 28 such that the clutch mechanism 12 remains engaged to maintain the coupling between the engine 14 and the gearbox 16.

In the event that the clutch pedal is actuated, that is, the answer to the decision step 106 is yes, then the process 100 proceeds to a decision step 108. At this step 108, the process 100 determines with the use of an energy saving algorithm if the clutch mechanism 12 is fully opened. If the answer is yes, then the process 100 again proceeds to step 105 to de-energize the solenoid 28, which closes off the flow of fluid 24. As such, the clutch mechanism remains fully open, that is, not engaged. Note that in these circumstances, this is the situation where conventional clutch systems consume a significant amount of energy. With the electro-hydraulic clutch system 10, however, energy consumption is minimized since both the solenoid 28 and the actuator 18 can be de-energized while keeping the clutch fully opened. Accordingly, when the motor vehicle is stopped, for example, at a red light, then the electro-hydraulic clutch system 10 does not need energy to hold the clutch mechanism 12 opened.

Finally, if the decision step 108 determines that the clutch mechanism 12 is not fully opened, that is, the answer to the decision step 108 is no, then the process 100 proceeds to a step 110, where the process 100 energizes the solenoid 28 to enable control of the clutch mechanism 12 to open or close the clutch mechanism 12 as the driver desires. Finally, the process 100 proceeds to a step 112 where the process 100 ends.

The description of the invention is merely exemplary in nature and variations that do not depart from the gist of the invention are intended to be within the scope of the invention. Such variations are not to be regarded as a departure from the spirit and scope of the invention.

What is claimed is:

1. An electro-hydraulic clutch system for a motor vehicle comprising:
a clutch mechanism that selectively engages an engine of the motor vehicle with a gear box;
an actuator that pumps and retrieves hydraulic fluid to and from the clutch mechanism to activate the clutch mechanism;
a solenoid with a valve, the solenoid being disposed in the path of the hydraulic fluid between the actuator and the clutch mechanism
a controller that provides instructions to the solenoid, the controller having a software algorithm stored in a non-transitory computer readable mechanism, the instructions to the solenoid being associated with the algorithm, and
wherein the algorithm is executed to determine if there has been a fault, if a clutch pedal is actuated, and if the clutch mechanism is fully opened, and
wherein the solenoid has a normally closed position to prevent flow of the hydraulic fluid back to the actuator in the event of a fault in the electro-hydraulic clutch system.

2. The electro-hydraulic clutch system of claim 1 wherein the valve of the solenoid is a check ball.

3. The electro-hydraulic clutch system of claim 1 wherein the flow of the hydraulic fluid results in engagement and dis-engagement of the clutch mechanism.

4. The electro-hydraulic clutch system of claim 1 wherein the clutch mechanism is a normally closed clutch mechanism.

5. The electro-hydraulic clutch system of claim 1 wherein the clutch mechanism is a normally open clutch mechanism.

6. The electro-hydraulic clutch system of claim 1 wherein if there is a fault, the controller de-energizes the solenoid to hold the current clutch position.

7. The electro-hydraulic clutch system of claim 1 wherein if the clutch pedal is not actuated, the controller de-energizes the solenoid to maintain the engagement of the clutch mechanism.

8. The electro-hydraulic clutch system of claim 1 wherein if the clutch mechanism is fully opened, the controller de-energizes the solenoid to maintain dis-engagement of the clutch mechanism.

9. The electro-hydraulic clutch system of claim 1 wherein if there has not been a fault, if the clutch pedal is actuated, and if the clutch mechanism is not fully opened, the controller energizes the solenoid to enable the clutch mechanism to open or close as desired by a driver of the motor vehicle.

10. A method of controlling an electro-hydraulic clutch apparatus for a motor vehicle comprising:
sending instructions from a controller to a solenoid, the controller having a software algorithm stored in a non-transitory computer readable mechanism, the instructions sent to the solenoid being associated with the algorithm;
executing the algorithm for
determining if there has a been a fault in the system,
determining if a clutch pedal has been actuated, and
determining if a clutch mechanism is fully opened,
wherein if there has not been a fault in the apparatus, if the clutch pedal has been actuated, and if the clutch mechanism is not fully opened, the solenoid is energized to control the flow of hydraulic fluid to and from the clutch mechanism to open and close the clutch mechanism as desired by a driver operating the motor vehicle.

11. The method of claim 10 wherein the solenoid includes a check ball valve that is normally closed when the solenoid is de-energized.

12. The method of claim 10 wherein the flow of the hydraulic fluid results in engagement and dis-engagement of the clutch mechanism.

13. The method of claim 10 wherein the hydraulic fluid is pumped to and retrieved from the clutch mechanism by an actuator.

14. The method of claim 10 wherein if there is a fault, the solenoid is de-energized to hold the current clutch position.

15. The method of claim 10 wherein if the clutch pedal is not actuated, the solenoid is de-energized to maintain engagement of the clutch mechanism.

16. The method of claim 10 wherein if the clutch mechanism is fully opened, the solenoid is de-energized to maintain dis-engagement of the clutch mechanism.

* * * * *